United States Patent [19]

Kent et al.

[11] Patent Number: 5,409,720

[45] Date of Patent: Apr. 25, 1995

[54] ROOM-TEMPERATURE SHELF-STABLE DOUGH MIX

[75] Inventors: Tom Kent; Holly Kent, both of Round Rock; Brian Harris; Michele Harris, both of Austin, all of Tex.

[73] Assignee: Day Day, Inc., Austin, Tex.

[21] Appl. No.: 69,982

[22] Filed: May 28, 1993

[51] Int. Cl.⁶ ..................... A21D 10/02; A21D 10/04
[52] U.S. Cl. .................... 426/128; 426/391; 426/397; 426/402; 426/413; 426/549; 426/551; 426/552; 426/555; 426/558
[58] Field of Search ............... 426/128, 391, 397, 402, 426/413, 549, 552, 551, 555, 558

[56] References Cited

U.S. PATENT DOCUMENTS

| | | |
|---|---|---|
| 1,889,882 | 12/1932 | Woods . |
| 3,096,179 | 7/1963 | Finucane et al. . |
| 3,160,507 | 12/1964 | Finucane . |
| 3,182,890 | 5/1965 | Elam . |
| 3,409,446 | 11/1968 | Van Olphen . |
| 3,533,802 | 10/1970 | Cooper et al. ................ 426/549 |
| 3,547,658 | 12/1970 | Melnick . |
| 3,753,734 | 8/1973 | Kaplow et al. . |
| 3,962,476 | 6/1976 | Turpin . |
| 4,524,083 | 6/1985 | Liot . |
| 4,557,377 | 12/1985 | Maloney . |
| 4,582,711 | 4/1986 | Durst ........................... 426/549 |
| 4,816,282 | 3/1989 | Kramer et al. . |
| 4,904,493 | 2/1990 | Petrizzelli ...................... 426/549 |
| 4,961,942 | 10/1990 | Cocco et al. . |
| 4,965,076 | 10/1990 | Martin et al. . |
| 4,965,077 | 10/1990 | Martin et al. . |
| 5,045,333 | 8/1991 | Petrofsky et al. . |
| 5,167,976 | 12/1992 | Papetti . |
| 5,171,599 | 12/1992 | Weber . |

*Primary Examiner*—Helen Pratt
*Attorney, Agent, or Firm*—Shaffer & Culbertson

[57] ABSTRACT

A dough mix includes a moist ingredient portion and dry ingredient portion capable of being combined to produce a complete dough requiring no additional ingredients including water or any other moisture. Additionally, both the moist ingredient portion and the dry ingredient portion are shelf-stable at room temperatures (65° F. to 80° F.) without the addition of chemical preservatives. The moist ingredient portion includes sugar, shortening, and all water or moisture required in the complete dough. Also, the moist ingredient portion preferably includes egg solids and flavorings such as vanilla. In any event the moist ingredient portion is mixed to have a water activity level of no greater than 0.85 to provide the desired shelf stability. The dry ingredient portion includes all flour required in the complete dough and may include leavening agents, egg solids, candy pieces, nuts, dried fruits, coconut, and other "dry" or moisture free ingredients. Both the moist and dry ingredient portions are preferably packaged in substantially air and water impermeable containers of single batch volumes such that the contents of the packages may simply be mixed together to produce the complete dough without measuring.

18 Claims, No Drawings

ROOM-TEMPERATURE SHELF-STABLE DOUGH MIX

BACKGROUND OF THE INVENTION

This invention relates to dough mixes and particularly to a multi-part dough mix that is complete and requires no additional ingredients to make the complete dough and further is shelf-stable at room-temperature without chemical preservatives. The invention also encompasses a method for producing a room-temperature, shelf-stable dough mix capable of being combined to form a complete dough.

Homemade or scratch baked goods have traditionally been preferred for their low ingredient cost and absence of preservatives and chemicals sometimes used by commercial bakers. Baking from scratch is, however, time, labor, and skill intensive. Furthermore, scratch baked products are subject to inconsistencies in quality. Dough or batter mixes were developed to accommodate the home baker who does not have the patience or skill required for scratch baking. However, such mixes have always required extra ingredients such as eggs, water, shortening or butter, or milk. Thus these prior mixes, although less labor and skill intensive than scratch baking, still required substantial labor and skill and were similarly subject to inconsistencies in the final baked products. Complete doughs have also been available to the home baker in the form of frozen or refrigerated dough. Although such frozen or refrigerated doughs were much more convenient than scratch baking and prior dough mixes, such complete doughs were relatively expensive due to the handling and refrigeration costs. Also, refrigeration and freezing may change the character of the dough or its constituents.

The same options available to the home baker were also available to commercial bakers. The commercial baker could either produce a dough from scratch, use incomplete mixes having to add ingredients, or pay the high cost of complete refrigerated or frozen doughs. The problems with these prior options were the same problems encountered by the home baker except on a larger scale.

Although many of the ingredients used in various types of doughs are shelf-stable at room temperatures by themselves, combining the ingredients causes bacterial or fungal growth and spoilage. For example, flour molds very quickly at room temperature when exposed to water. Baking soda and other leavening agents release $CO_2$ when exposed to water at room temperature. Also, egg solids and milk solids spoil very quickly when exposed to water at room temperatures. Even shortening and various types of sweeteners may spoil at room temperatures when exposed to water. The presence of water in complete doughs, therefore, has heretofore made mixes for complete doughs impossible without refrigeration or the addition of chemical preservatives.

SUMMARY OF THE INVENTION

It is an object of the invention to provide a non-refrigerated, chemical preservative-free, multi-part dough mix whose parts can be combined to produce a complete dough, and to provide a method of making such a multi-part complete dough mix. Another object of the invention is to provide a moist ingredient portion of a complete dough mix that includes all water required in the complete dough but is shelf-table at room temperature and requires no chemical preservatives.

In order to accomplish these objects, a dough mix according to the invention is separated into a moist ingredient portion or composition and a dry ingredient portion or composition. The dry and moist ingredient compositions are packaged in separate air and water impermeable containers for shipment to the end user, either a commercial baker or a home baker. Combining the dry and moist ingredient compositions produces a complete dough requiring no extra ingredients.

The moist ingredient portion includes at least a portion of the sugar required in the complete dough and all of the shortening and water required in the complete dough. The moist ingredient portion may also include whole egg solids and flavorings in addition to the sugar and water. In any event, the moist ingredient composition is combined so that it has a water activity $A_w$ no greater than 0.85.

Tests indicate that an $A_w$ no greater than 0.85 in the moist ingredient portion suppresses microbial growth and, therefore, prevents spoilage of the moist ingredient portion even at room temperature. The moist ingredient portion with the required $A_w$ no greater than 0.85 is shelf-stable at room temperature even when the composition includes whole egg solids. Tests indicate that the moist ingredient portion according to the invention has a shelf life at room temperature of at least six months.

The dry ingredient portion or composition includes all flour required in the complete dough. Preferably the dry ingredient portion also includes any leavening agent required in the complete dough and any pieces of additional ingredients such as chocolate chips, nuts, dried fruit, and other confections that may be added to a dough or batter.

In one preferred form of the invention, the dry and moist ingredient portions are packaged in an appropriate ratio to produce a single batch of the complete dough. Thus, a package of the dry ingredient portion and a package of the moist ingredient portion can simply be combined with no measuring to produce the complete dough. In alternative forms of the invention, particularly useful in commercial applications, the moist and dry ingredient portions may be packaged in bulk and combined at a commercial bakery according to volume or weight ratio to produce the complete dough.

The method of producing the dough mix according to the invention comprises combining at least the sugar, shortening, and water required in the complete dough to form the moist ingredient composition having a water activity no greater than 0.85. This step preferably includes creaming all of the shortening, sugar, and egg solids required in the complete dough and then adding all additional water, invert sugar, and flavorings. The method according to the invention also includes producing the dry ingredient portion that includes at least all of the flour required to produce the complete dough. Preferably the method also includes packaging a single batch portion of each of the dry and moist ingredient portions in separate substantially air and water impermeable packages or containers.

The dough mix according to the invention does not require any added ingredients. Therefore, the present dough mix produces a consistent baked product and requires minimal labor and skill. The dough mix is particularly suitable for home use and may also be used by commercial bakeries to reduce the costs associated with producing fresh baked goods. In either case, the mix itself and thus the end product produced from the mix may contain no chemical preservatives.

These and other objects, advantages, and features of the invention will be apparent from the following description of the preferred embodiments and specific examples.

DESCRIPTION OF THE PREFERRED EMBODIMENTS

The dough mix embodying the principles of the invention includes two separate portions or compositions, a moist ingredient portion and a dry ingredient portion. The moist ingredient and dry ingredient portions can be combined to produce a complete dough that needs no additional ingredients. The invention may be used to produce numerous types of dough or batter, particularly for baked goods including cookie dough, brownie dough, and cake dough and batter. The complete dough includes at least sugar, flour, shortening, and water, and may include other constituents such as egg solids, flavorings, leavening agents, candy pieces, nuts, fruits, and milk solids.

For purposes of this disclosure and the accompanying claims, "sugar" may include appropriate monosaccharides and disaccharides in either refined or unrefined forms and preferably includes both granulated and powdered sucrose, raw sugar, turbinado sugar, brown sugar, and invert sugar. The "sugar" incorporated in mixes according to the invention may also include sweeteners such as fructose, dextrose, glycerol, glycerin, maltose, arabinose, sorbitol, maple syrup, corn syrup, molasses, honey, fondant, aspartame, saccharin, acesulfame K, polydextrose, sucralose, alitame, and isomalt. "Shortening" may include any suitable edible fat or fat substitute in either solid or liquid form at room temperature including vegetable oil, sunflower oil, safflower oil, cottonseed oil, canola oil, soybean oil, olive oil, coconut oil, and palm oil. As used herein, "shortening" may also include animal fats including butter and lard. "Shortening" may also include fat substitutes including cellulose, gums, dextrins, maltodextrins, modified food starch, polydextrose, microparticulated protein, protein blends, emulsifiers, lipid analogs, esterified propoxylated glycerol, and sucrose polyesters.

The moist ingredient portion of the dough mix according to the invention, includes all water required in the complete dough mixed at least with sugar and preferably other ingredients in the complete dough to form a composition having a water activity ($A_w$) no greater than 0.85 and preferably below 0.80. Tests indicate that the moist ingredient portion according to the invention with an $A_w$ no greater than 0.85 is shelf-stable at room temperature for at least six months, even with whole egg solids included in the mixture. As used herein, "room temperature" may be any temperature in the range of approximately 65° F. to 80° F. Also, "shelf-stable" may be defined according to this disclosure as a product that over a time period of at least six months exhibits microbial growth that results in an aerobic plate count of no more than 100,000 per gram.

As used in this disclosure, water activity or $A_w$ may be defined as the ratio of vapor pressure of a solution or mixture to that of pure water at a specific temperature. In other words, $A_w$ equals the equilibrium relative humidity. The water activity is a measure of the free or available water in the mixture. As is known in the field, water activity may be measured by measuring the equilibrium vapor pressure of a mixture at a particular temperature and expressing that value as a ratio to the equilibrium water vapor pressure as that temperature.

$A_w$ value of the moist ingredient portion is lowered to the 0.85 value by hydrogen bonding between the "sugar" or other ingredient molecules and water molecules. The hydrogen bonding ties up the water molecules preventing free movement of water molecules in the composition. The $A_w$ value may be adjusted by modifying the ratio of "sugar" or other hydrogen bonding agents to water in the moist ingredient portion.

The moist ingredient portion according to the invention requires no chemical preservatives to provide room temperature shelf stability even though the composition includes all water or other moisture required in the complete dough and preferably whole egg solids. For purposes of this disclosure, "chemical preservatives" include sodium benzoate, potassium sorbate, BHT (butylated hydroxytoluene), BHA (butylated hydroxyanisole), and other similar preservatives.

The constituents of the complete dough that may be included in the wet ingredient portion include water, shortening, sugar, egg solids, flavorings such as vanilla or vanilla substitutes, and salt. Certain ingredients however, can not be exposed to moisture and remain shelf-stable even at an $A_w$ at or below 0.85. For example, flour molds rapidly when exposed to water at room temperature. Thus the mix according to the invention includes a dry ingredient portion that includes all the flour required in the complete dough. Additionally, leavening agents such as baking soda release $CO_2$ when exposed to water and also can not be included in the moist ingredient portion. Thus any baking soda in the complete dough is included in the dry ingredient portion.

For the purposes of this disclosure, flour may include wheat flour, or any cereal or other grain flour, or legume flours or the like. The dry ingredient portion may also include whole grains such as oats and may also include nuts, dried fruits, chocolate or candy pieces, and dry flavorings such as spices and cocoa.

Some ingredients in the complete dough may be included in either the moist ingredient portion or the dry ingredient portion. For example, salt and dried flavorings and spices may be included in either the dry or moist ingredient portions. Also, dry egg solids may be blended into the moist ingredient composition or may be included in the dry ingredient composition. In any event, the dough mix according to the invention will include all flour required in the complete dough in the dry ingredient portion and all water required in the complete dough in the moist ingredient portion along with sufficient sugar or other ingredients to produce the desired $A_w$. In some cases the complete dough and thus the moist ingredient portion may require no additional water and the water or moisture necessary in the complete dough may be that included in corn syrup and other "sugars" as defined herein or that is included in flavorings such as vanilla.

The following examples illustrate dough mixes embodying the principles of the invention with the various ingredients broken down into the moist and dry portions or compositions.

EXAMPLE 1

Basic Cookie Dough

Weight Percentage

Moist Ingredient Portion

Basic Cookie Dough -continued

| | Weight Percentage |
|---|---|
| Granulated Sucrose | 30.30% |
| Shortening (Hydrogenated cottonseed or soybean oil) | 23.21% |
| Water | 4.70% |
| Egg Solids | 2.76% |
| Invert Sugar | 2.76% |
| Vanilla | .97% |
| Salt | .30% |
| Total Moist Ingredient Portion in Complete Dough | 65.00% |
| Dry Ingredient Portion | |
| Wheat Flour (cake flour) | 30.00% |
| Oats | 4.55% |
| Baking Soda | .45% |
| Total Dry Ingredient Portion in Complete Dough | 35.00% |

EXAMPLE 2

Sugar Cookie Dough

| | Weight Percentage |
|---|---|
| Moist Ingredient Portion | |
| Granulated Sucrose | 36.24% |
| Shortening (Hydrogenated cottonseed or soybean oil) | 21.62% |
| Water | 6.03% |
| Egg Solids | 3.53% |
| Vanilla | .69% |
| Salt | .18% |
| Total Moist Ingredient Portion in Complete Dough | 68.29% |
| Dry Ingredient Portion | |
| Wheat Flour (cake flour) | 31.43% |
| Baking Soda | .28% |
| Total Dry Ingredient Portion Complete Dough | 31.71% |

EXAMPLE 3

BROWNIE DOUGH

| | Weight Percentage |
|---|---|
| Moist Ingredient Portion | |
| Shortening | 19.40% |
| Egg Solids | 3.60% |
| Brown Sugar | 12.60% |
| White Sugar | 12.60% |
| Salt | .20% |
| Invert Sugar | 2.30% |
| Corn Syrup | 2.40% |
| Vanilla | .80% |
| Water | 6.20% |
| Total Moist Ingredient Portion in Complete Dough | 60.10% |
| Dry Ingredient Portion | |
| Flour (cake flour) | 23.40% |
| Cocoa | 4.70% |
| Chocolate Chips | 11.80% |
| Total Dry Ingredient Portion in Complete Dough | 39.90% |

EXAMPLE 4

BUTTER COOKIE DOUGH

| | Weight Percentage |
|---|---|
| Moist Ingredient Portion | |

BUTTER COOKIE DOUGH -continued

| | Weight Percentage |
|---|---|
| Shortening | 27.88% |
| Sugar | 21.15% |
| Water | 10.58% |
| Egg Solids | 4.49% |
| Flavoring | 1.45% |
| Vanilla | 0.48% |
| Total Moist Ingredient Portion in Complete Dough | 66.03% |
| DRY INGREDIENT PORTION | |
| Flour | 33.97% |
| Dry Ingredient Portion in Complete Dough | 33.97% |

The method of producing the dough mix according to the invention comprises combining at least sugar and all water required in the complete dough together with a suitable mixing device to produce a composition having a water activity level less than 0.85. As indicated in the above Examples, recipes according to the invention may also include shortening, invert sugar, egg solids, and liquid extract flavoring such as vanilla. In the preferred method of the invention, the granulated sugar, shortening, salt, and egg solids are first creamed together using a suitable mixing apparatus and then the water, invert sugar, and vanilla are added and blended into the creamed mixture. The sugar, shortening, salt, and egg solids in the Examples 1 or 2 may be creamed with a HOBART vertical mixer at low or No. 1 speed for three minutes using a paddle. To this creamed mixture the water, invert sugar and vanilla may be added individually or premixed together and mixed with the HOBART vertical mixer on speed No. 1 for 1.5 minutes and then two minutes at speed No. 2 to produce the moist ingredient composition having an $A_w$ of approximately 0.78. Day old samples of the moist ingredient portion produced in this manner contained an aerobic plate count per gram of 90 while one month old samples stored at room temperatures in a sealed polyethylene pouch contained an aerobic plate count per gram of 250, at a water activity of 0.77. Samples of the moist ingredient portion of Example 4, combined similarly, had a water activity level of 0.81.

The dry ingredients including flour are mixed separately from the moist ingredients by any suitable mixing device. In the form of the invention illustrated for example in Example 1, the step of mixing the dry ingredients includes combining flour, baking soda, and oats in the indicated weight percentages with respect to the desired weight of complete dough.

One preferred method of producing the dough mix according to the invention also comprises packaging single batch portions of both the moist ingredient composition and the dry ingredient composition in separate substantially air and water impermeable containers. Suitable containers include heat or otherwise sealed polyethylene pouches or polyester/polyethylene or polyester/seran/polyethylene laminate pouches. Those skilled in the art will readily appreciate that polyethylene and polyester/polyethylene laminates are not completely water and air impermeable, however, 4 mil. polyethylene does provide a substantially impermeable air and water barrier within the scope of the invention.

Although the single batch portions are particularly useful in that the moist ingredient portion and dry ingredient portion can be easily combined without measuring to produce the complete dough, alternative forms of the invention may include packaging the moist ingredient portion and dry ingredient portion in separate bulk containers. The separate moist and dry ingredient portions may then be combined by suitable weight or volume ratios to produce the complete dough mix. Regardless of whether the packaging is in single batch or bulk containers or packages, the packages require no special sterilization to produce the shelf stability of either the moist or dry ingredient portions.

The above described preferred embodiments are intended to illustrate the principles of the invention, but not to limit the scope of the invention. Various other embodiments and modifications to these preferred embodiments may be made by those skilled in the art without departing from the scope of the following claims.

We claim

1. A dough mix capable of being combined to produce a complete dough including sugar, shortening, flour, and water, the dough mix comprising:
   (a) a moist ingredient portion contained in a substantially air and water impermeable container, the moist ingredient portion including sugar, shortening, and substantially all water required in the complete dough mixed together with the ratio of water to the combination of water and sugar in the moist ingredient portion being below 0.33 to 1 by weight such that the moist ingredient portion is shelf-stable at room temperatures; and
   (b) a room-temperature, self-stable dry ingredient portion contained in a substantially air and water impermeable container, the dry ingredient portion including all of the flour required in the complete dough and being capable of being combined with the moist ingredient portion to produce the complete dough.

2. The dough mix of claim 1 wherein the moist ingredient portion has a water activity no greater than 0.85.

3. The dough mix of claim 1 wherein the complete dough includes egg solids and the moist ingredient portion includes all of the egg solids required in the complete dough mixed together with the water, sugar, and shortening with the ratio of water to the combination of water and egg solids in the moist ingredient portion being below 0.7 to 1 by weight.

4. The dough mix of claim 1 wherein the moist ingredient portion includes all of the sugar required in the complete dough.

5. The dough mix of claim 1 wherein the moist ingredient portion includes all salt required in the complete dough.

6. The dough mix of claim 1 wherein the sugar in the moist ingredient portion comprises sucrose and invert sugar.

7. The dough mix of claim 1 wherein the sugar in the moist ingredient portion is selected from the group consisting of sucrose, fructose, dextrose, glyceride, maltose, glycerin, and sorbitol.

8. The dough mix of claim 1 wherein the dry ingredient portion includes a leavening agent.

9. A moist ingredient composition used in producing a complete dough that includes at least sugar, shortening, flour, and water, the moist ingredient composition being contained in a substantially air and water impermeable container and being capable of being combined with a dry ingredient composition that includes all flour required in the complete dough to produce the complete dough, the moist ingredient composition comprising:
   (a) sugar and all water and shortening required in the complete dough, mixed together with the ratio of water to the combination of water and sugar in the moist ingredient composition being below 0.33 to 1 by weight such that the moist ingredient composition is shelf-stable at room temperatures.

10. The moist ingredient composition of claim 9 wherein the sugar, water, and shortening are combined such that the moist ingredient composition has a water activity no greater that 0.85.

11. The moist ingredient composition of claim 9 further comprising all of the sugar required in the complete dough.

12. The moist ingredient composition of claim 9 further comprising all salt required in the complete dough.

13. The moist ingredient composition of claim 9 further comprising all egg solids required in the complete dough mixed together with the water, sugar, and shortening with the ratio of water to the combination of water and egg solids in the moist ingredient composition being below 0.7 to 1 by weight.

14. The moist ingredient composition of claim 9 wherein the sugar therein comprises sucrose and invert sugar.

15. The moist ingredient composition of claim 9 wherein the sugar therein is selected from the group consisting of sucrose, fructose, dextrose, glyceride, maltose, and glycerin, and sorbitol.

16. A method of producing a room-temperature, shelf-stable mix for a complete dough that includes sugar, shortening, flour, and water, the method comprising the steps of:
   (a) producing a moist ingredient composition by mixing together at least sugar, shortening, and all water required in the complete dough with the ratio of water to the combination of water and sugar in the moist ingredient composition being below 0.33 to 1 by weight;
   (b) mixing dry dough forming ingredients to produce a dry ingredient composition including all flour required in the complete dough, the dry ingredient composition being capable of being combined with the moist ingredient composition to produce the complete dough; and
   (c) placing the moist ingredient composition in a substantially air and water impermeable container and placing the dry ingredient composition in a separate container.

17. The method of claim 16 wherein the step of producing the moist ingredient composition includes combining the sugar, shortening, and water such that the moist ingredient composition has a water activity of no greater than 0.85.

18. The method of claim 16 wherein the step of producing the moist ingredient composition includes mixing egg solids together with sugar, shortening, and water with the ratio of water to the combination of water and egg solids in the moist ingredient composition being below 0.7 to 1 by weight.

* * * * *